US007451158B1

(12) United States Patent
Vogt et al.

(10) Patent No.: US 7,451,158 B1
(45) Date of Patent: Nov. 11, 2008

(54) SYSTEM AND METHOD FOR CREATING, APPENDING AND MERGING A WORK MANAGEMENT FILE

(75) Inventors: Bob Vogt, Redmond, WA (US); Raju Iyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1207 days.

(21) Appl. No.: 10/305,632

(22) Filed: Nov. 27, 2002

(51) Int. Cl.
*G06F 17/30* (2006.01)

(52) U.S. Cl. .......................... 707/102; 707/1; 707/100; 707/101; 705/8; 705/9

(58) Field of Classification Search .................... 707/1, 707/100, 101, 102; 705/8, 9
See application file for complete search history.

(56) References Cited

U.S. PATENT DOCUMENTS 6,954,737 B2 *  10/2005  Kalantar et al. ............... 705/50

7,096,224 B2 *  8/2006  Murthy et al. ............... 707/100

OTHER PUBLICATIONS

Pyron Tim, "Using Microsoft Project 98", Que Corporation, Special Edition, copyright 1997, pp. 593-634.*
Pyron Tim, "Using Microsoft Project 98", Que Corporation, Special Edition, copyright 1997, pp. 177,178 and 205-207.*

* cited by examiner

*Primary Examiner*—Hung Q. Pham
(74) *Attorney, Agent, or Firm*—Perkins Coie LLP

(57) ABSTRACT

A set of defining guidelines, referred to as a schema, can be used to create, append, or merge a work management file. The data for the work management file can be received from files made with different application programs, such as spreadsheet or database software. The schema can be configured in extensible markup language (XML). The schema can reside in memory or it can reside in a file. The schema can be used with serializers that retrieve data from files that may have not been created by a work management program in order to retrieve a work management file. A scheduling engine that includes rules can resolve any work management conflicts that may exist in the data after it has been validated with the schema.

11 Claims, 11 Drawing Sheets

← 900

```
<tasks>
<task>
<name>
task 1
</name>
<start>
1/1/2001
</start>
<duration>
1 day
</duration>
<task>
<name>
task 2
</name>
<start>
1/1/2001
</start>
<predecessor>
task 1
</predecessor>
</tasks>
```

*Fig. 9*

Rule N:

If a task is defined as being dependent on another task such that the dependent task must start when the predecessor task has been completed, change the start date of the dependent task to the finish date of the predecessor task

*Fig. 10*

SYSTEM AND METHOD FOR CREATING, APPENDING AND MERGING A WORK MANAGEMENT FILE

TECHNICAL FIELD

The present invention relates to work management files and more specifically it relates to a schema that can be applied for the purpose of creating, appending, and merging a work management file.

BACKGROUND OF THE INVENTION

Work management programs have become a popular tool for scheduling and managing work such as construction, maintenance, investing, etc. A work management file can typically be created in a work management program and manipulated accordingly. A work management file typically includes work tasks, resources, assignments, calendars, and other attributes related to work.

There are numerous situations in which work management data needs to be imported from a non-work management file to a work management file. For example, data regarding tasks may be tracked in a file using a spreadsheet program or database program that needs to be appended or merged to an existing work management file. In some cases, the database or spreadsheet program can be used to create a new work management file. Typically, a file from the spreadsheet or database program is not directly compatible with a work management program file.

Existing systems and methods have attempted to import work management data into a work management file from a non-work management file using a comma-separated values (CSV) file. However, these systems and methods have shortcomings because the data typically has to be manually mapped from the non-work management file to the work management file so that it can be used in a work management program. Thus, the existing systems and methods for importing work management data into a work management file from a non-work management file are typically complicated and inefficient.

Accordingly there is a need in the art for a system and method to create a new work management file from data that was created in a non-work management file. There is also a need in the art for a system and method to take data from a non-work management file and append it to an existing work management file. Additionally, there is a need in the art for a system and method to merge data created with a non-work management file with data formatted in an existing work management file.

SUMMARY OF THE INVENTION

The present invention provides a set of guidelines, called a schema, which can define the structure and content of a work management file used in a work management program. A work management file can typically comprise information such as work tasks, assignments, resources and the timing to perform such work tasks, and other information (or data) related to work or a project. The schema and scheduling engine of the present invention can allow the transfer of data related to work management from files created in other types of programs, such as a spreadsheet program or database program, to a new or existing file in a work management program. Thus, the schema and scheduling engine can create or edit a work management file by using data from a file created in another program.

The schema is typically implemented as a file that can be stored in a computer system memory, such as a hard-disk drive (HDD) and/or random access memory (RAM). The schema is typically written in an extensible markup language (XML) format.

The schema can be used with serializers, which retrieve data in a piece by piece sequential format. The serializers can be implemented as software and typically each serializer can be specialized for application to a particular type of program. As a simple example, a spreadsheet serializer is typically used for loading and saving data generated by a spreadsheet program.

Working with the schema, a scheduling engine contains work management rules to resolve conflicts between retrieved data and existing data. For example, if data for a first work task is added to an existing work management file and the file already contains a second work task that conflicts on some level with the first task, this conflict may be resolved according to the rules contained in the scheduling engine. As a more specific example, if the start of the first task is dependent on the completion of the second task and both tasks are scheduled for the same start date, the start date of the first task can be changed to coincide with the finish date of the second task.

The scheduling engine can also resolve conflicts between data when a new work management file is created. The scheduling engine can also resolve conflicts between existing data after new data is loaded when new data has been merged or appended to the existing data.

One advantage of the scheduling engine is that it yields consistent work management files irrespective of the source of the work data.

In accordance with the features of the present invention, the schema is used to create a new or to modify an existing work management file of a work management program. The data of interest can be read and compared to the requirements of the schema. These requirements may include the syntax (i.e., specific format) and content of the data that is needed in order to create a well-formed work management file. If the data meets the schema requirements, the data can be loaded, for example, into a memory of a computer system and arranged in predefined fields that correspond to the structure of a work management file. However, if the data does not meet the schema requirements, the data will typically be rejected and indicated as not being in a valid work management file format, and the process will stop if the deficiencies are significant with respect to the schema.

Once the data has been successfully loaded, the data can be checked for conflicts according to the work management rules contained in the scheduling engine. If any conflicts in the data are determined, they are resolved in accordance with the rules. The new or modified existing work management file is displayed and can be manipulated by a user of a work management program.

BRIEF DESCRIPTION OF THE DRAWINGS

FIG. 9 illustrates exemplary work management data according to an exemplary embodiment of the present invention.

FIG. 10 illustrates an exemplary rule, which is typically contained in the scheduling engine, to resolve conflicts between work management data according to an exemplary embodiment of the present invention.

DETAILED DESCRIPTION OF EXEMPLARY EMBODIMENTS

A schema can be used to create a new or modify an existing work management file of a work management program. The data of interest can be read and compared to the requirements of the schema. These requirements may include the syntax and content of the data that is needed in order to create a well-formed work management file. If the data meets the schema requirements, the data can be loaded, for example, into a memory of a computer system and arranged in predefined fields that correspond to the structure of a work management file. However, if the data does not meet the schema requirements, the process will stop and the data will typically be rejected and indicated as not being a valid work management file format. Once the data has been successfully loaded, the data can be checked for conflicts according to the work management rules contained in a scheduling engine. If any conflicts in the data are determined, they are resolved in accordance with the rules. The new or modified existing work management file is displayed and can be manipulated by a user of a work management program.

Exemplary Operating Environment

Figure 1:
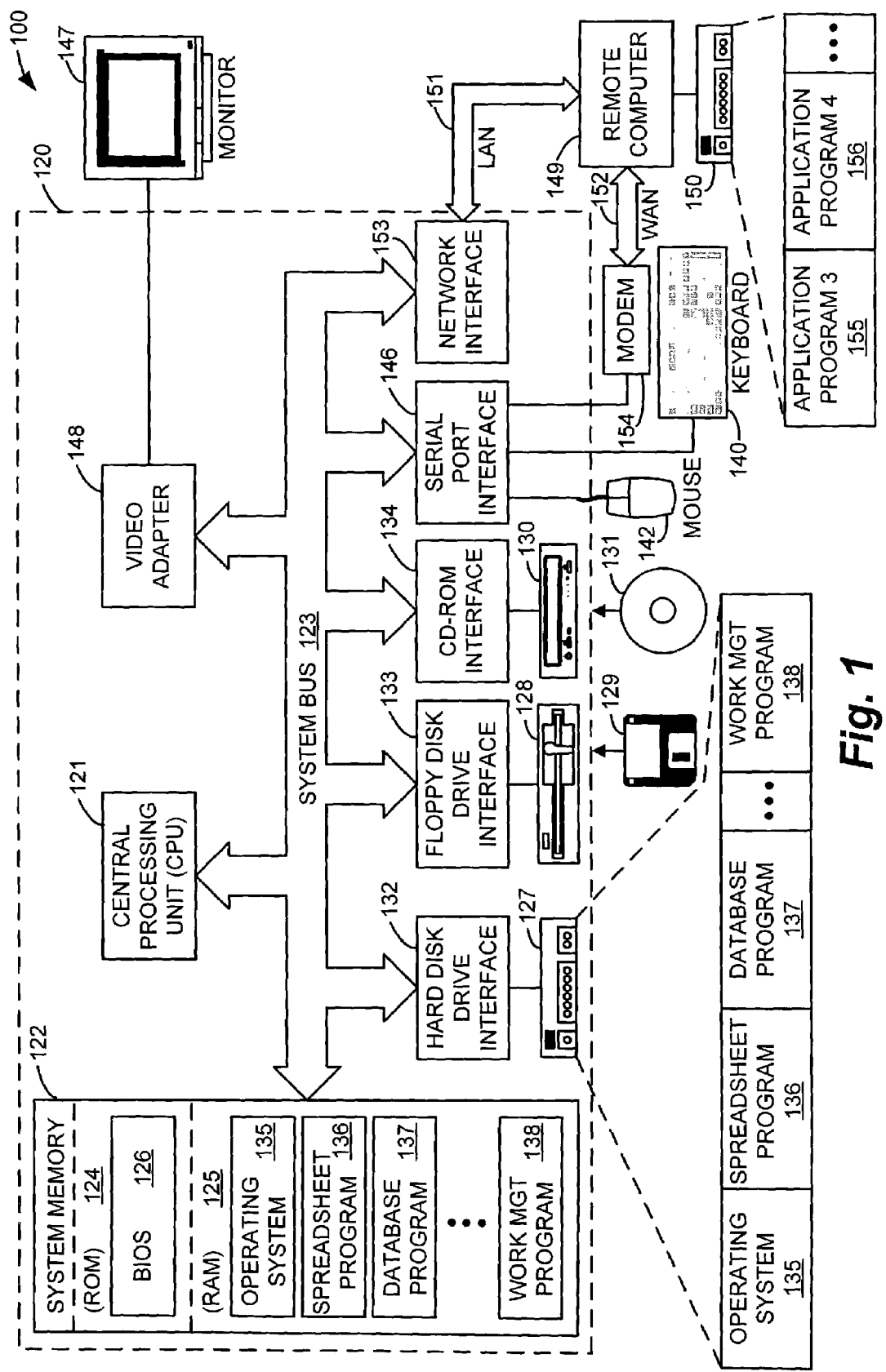
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 is a block diagram illustrating an exemplary operating environment for implementation of various embodiments of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a spreadsheet program 136, a database program 137, and a work management program 138. Program modules include routines, sub-routines, programs, objects, components, data structures, etc., which perform particular tasks or implement particular abstract data types. Aspects of the present invention can be implemented to create or merge a work management file for use in the work management program 138.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor 147, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules 155, 156 or portions thereof, depicted relative to remote computer 149, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Exemplary Architecture

Figure 2:
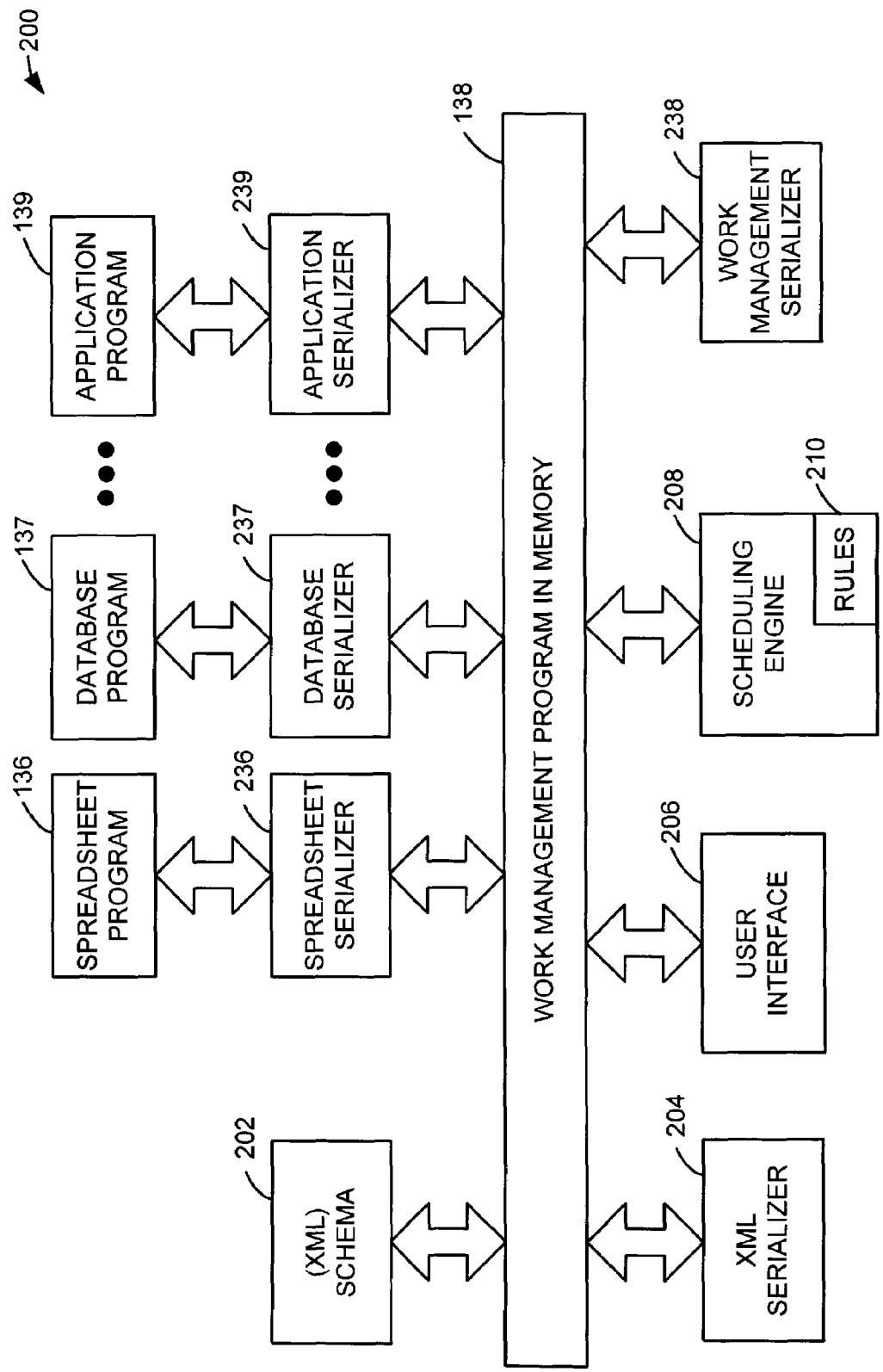
FIG. 2 is a block diagram illustrating an exemplary architecture of various software elements according to an exemplary embodiment of the present invention.

FIG. 2 is a block diagram illustrating an exemplary architecture of various software elements according to an exemplary embodiment of the present invention. The elements of the exemplary architecture 200 are typically stored in memory, such as the RAM 125 and/or the hard disk drive 127 of the personal computer 120 shown in FIG. 1. The exemplary architecture 200 includes a work management program 138. The work management program 138 is typically a software application program that can be used to access and manipulate a work management file (not depicted). A work management file can typically contain information such as work tasks, assignments, resources and the timing to perform such work tasks, among other information (or data) related to work or a project. A typical example of a work management program is Microsoft Project 2002 (see e.g., www.microsoft.com/project).

As depicted in FIG. 2, the work management program 138 can be in communication with several other elements of the exemplary architecture 200. In this regard, the work management program 138 can be in communication with a work management serializer 238. The work management serializer 238 is typically configured to retrieve data from the work management program 138 and convert it to a serial data format (e.g., one bit after another). Data can be retrieved by the work management serializer 238 for further processing by other elements, as will be discussed below.

The work management program 138 can also be in communication with several other types of serializers. Some of these serializers may be in communication with other elements, such as application programs, as well. For example, the work management program 138, can be in communication with an extensible markup language (XML); serializer 204, a spreadsheet serializer 236, a database serializer 237, and various other types of serializers, which are generally depicted in FIG. 2 by an application serializer 239. As shown, the spreadsheet serializer 236, database serializer 237, and application serializer 239 can be in communication respectively with a spreadsheet program 136, a database program 137, and an application program 139.

Similar to the work management serializer 238, the XML serializer 204, spreadsheet serializer 236, database serializer 237, and application serializer 239 are typically configured to retrieve data from a respective application program or module and convert it to a serial data format (that is typically work management system specific), when transferring data from a respective application program to the work management program 138. For example, the spreadsheet serializer 236 is typically configured to retrieve data from the spreadsheet program 136 and convert it into a serial format for processing by the work management program 138. Likewise, the database serializer 237 and application serializer 239 are typically configured to retrieve data from their respective application programs and convert the data into a serial format for processing by the work management program 138.

The spreadsheet program 136 is typically a software application program that can be used to access and manipulate spreadsheet files, which typically simulate spreadsheets or worksheets for analysis of numerical and textual data. A typical example of a spreadsheet program is Microsoft Excel (see e.g., www.microsoft.com/excel). The database program 137 is typically a software application program that can be used to access and manipulate database files, which are typically used to organize and search compilations of data. A typical example of a database program is Microsoft Access (see e.g., www.microsoft.com/access). As discussed above, other application programs (e.g., application program 139) can also be in communication with other application serializers (e.g., application serializer 239), and such application programs may be known in the art.

The XML serializer 204 is typically configured to retrieve XML data and convert it into a serial format, that is typically work management system specific, for processing by the work management program 138. As is known in the art, XML (i.e., extensible markup language) is an open standard for describing data in documents and web pages. XML is recognized for the flexibility it offers to users to create compatible files from different programs. Thus, a file created in XML format by one program can typically be used in a different program that also recognizes XML format. This feature of XML can be implemented in embodiments of the present invention to allow the exchange of data from the spreadsheet program 136, database program 137, or other application program 139 to the work management program 138, as will be discussed below.

Figure 11:
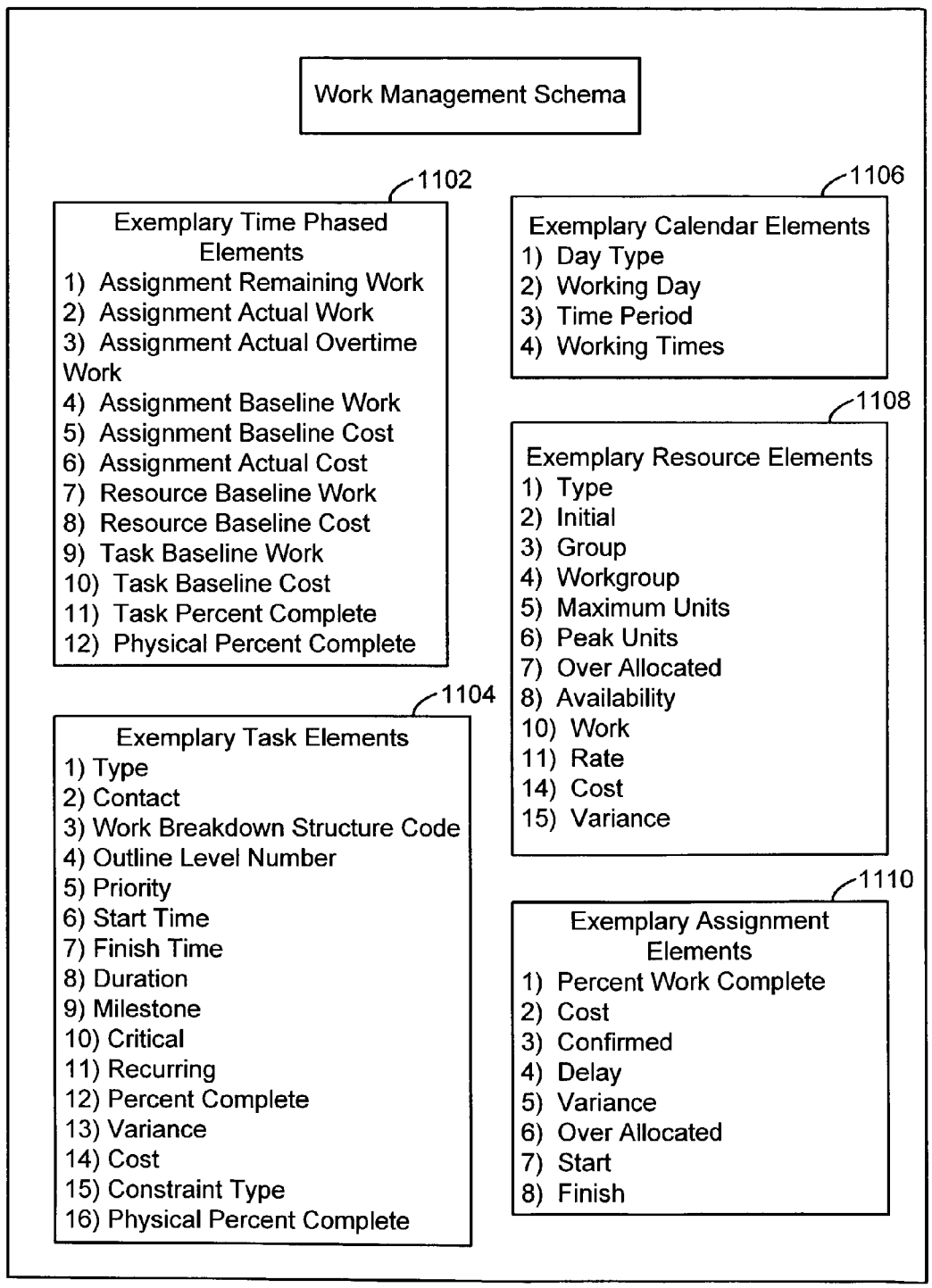
FIG. 11 illustrates exemplary element groups of an exemplary work management schema according to an exemplary embodiment of the present invention.

The work management program 138 is also in communication with a schema 202, which in some embodiments of the present invention is preferably in an XML format. A schema, as is known in the art, typically defines the structure of a file, such as a work management file. A schema also typically defines the type of data content that the data elements of the file structure can contain. Thus, the schema 202 essentially provides guidelines that define the structure and content of a file. In embodiments of the present invention, the schema 202 can be use to define the structure and content of a work management file for use in the work management program 138. In this regard, FIG. 11 illustrates exemplary element groups (which will be discussed below) of an exemplary work management schema according to an exemplary embodiment of the present invention.

As mentioned above, the schema 202 can be an in XML format in accordance with some embodiments of the present invention. In such embodiments, the XML schema 202 typically defines the structure and content of a file in XML format. For example, as will be discussed in further detail below, the XML schema 202 can be compared to XML files created in other programs, such as the spreadsheet program 136 or the database program 137. Such comparisons can be used to verify that the files have the appropriate structure and content for implementation as a new or merged work management file for access and manipulation using the work management program 138.

The exemplary architecture 200 also includes a scheduling engine 208 that is also in communication with the work management program 138. As depicted in FIG. 2, the scheduling engine typically includes rules 210. The rules 210 typically define guidelines for data used to create a work management file or merge with other data of an existing work management file. For example, the rules 210 may include guidelines to resolve a conflict in scheduling data, such as the scheduling of two work tasks for the same start date when the start of one task depends on the completion of the other. FIG. 10 illustrates an exemplary rule in this regard to resolve a timing conflict between two tasks. As will be discussed below, the scheduling engine 208, in conjunction with the schema 202, can be used in embodiments of the present invention to provide consistent work management files, regardless of the application program that the data is retrieved from.

A user interface 206 is also included as part of the exemplary architecture 200. The user interface 206 is typically in communication with the architecture 200 via the work management program 138. The user interface 206 may comprise one or more predefined graphical screen displays that allow a user to enter work management data to the work management program 138. The user interface 206 may also comprise dialog boxes that display information regarding the work management program 138.

As discussed above, the elements of the exemplary architecture 200 are typically in the form of software that is stored in memory. Thus, these elements can be implemented in various programming languages that are known in the art, such as Visual Basic and C, among others. Furthermore, the applications programs of the exemplary architecture 200, such as the spreadsheet program 136, the serializers, such as the database serializer 237, and the user interface 206 can be implemented by software applications or modules that are known in the art.

Exemplary Embodiments

Figure 3:
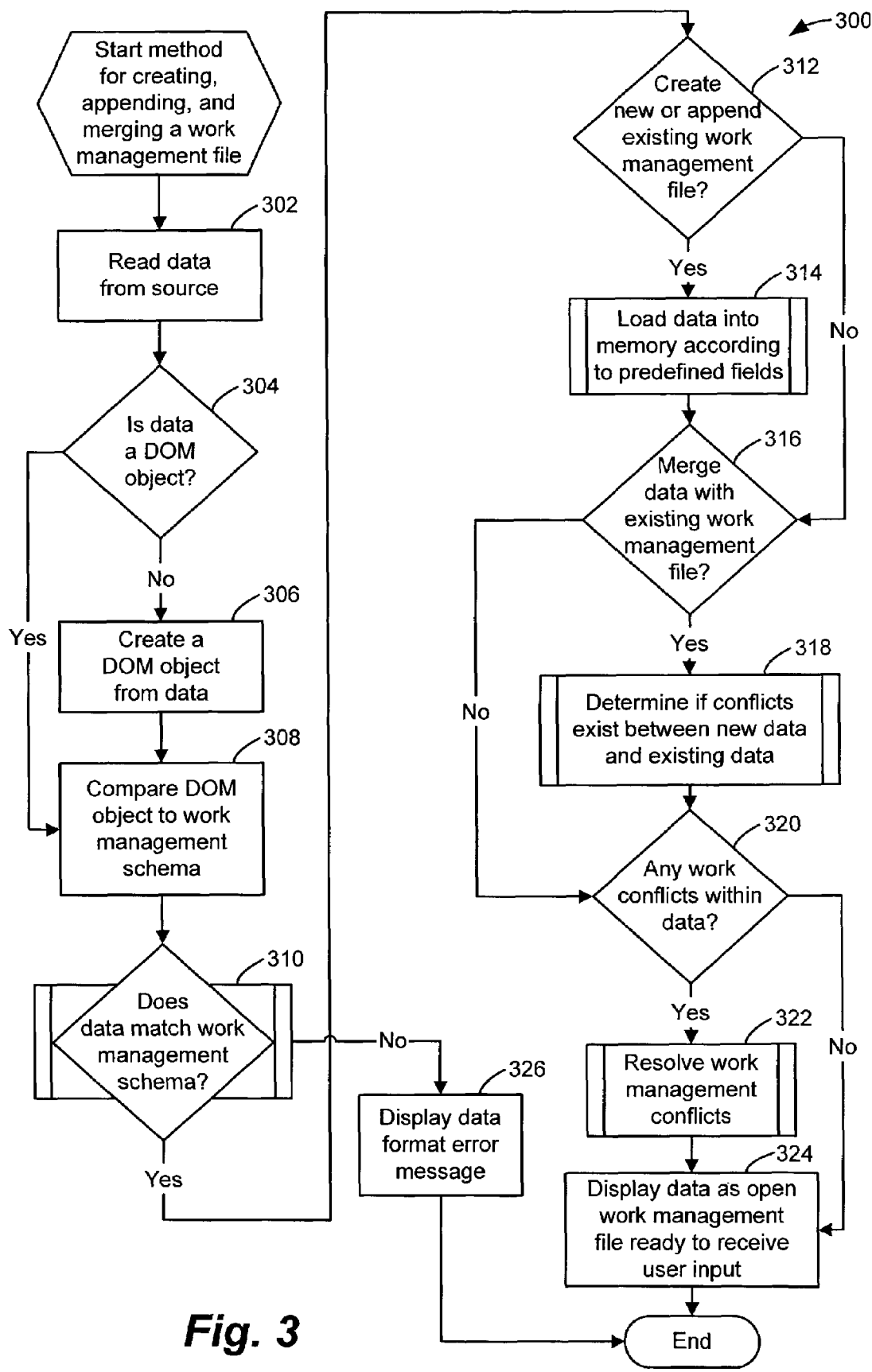
FIG. 3 is a logic flow diagram illustrating an overview of an exemplary method for creating, appending, and merging a work management file according to an exemplary embodiment of the present invention.

Referring now to FIG. 3, this figure is a logic flow diagram illustrating an overview of an exemplary method for creating, appending, and merging a work management file according to an exemplary embodiment of the present invention. To facilitate the discussion, the exemplary method 300 will be described with respect to elements of FIG. 1 and FIG. 2, that were described above, as applicable.

The exemplary method begins with step 302 in which data is read from a source. Typically the data relates to work management. For example, the data may describe work management tasks, resources, or assignments. The data can be typically contained in a work management file that can be accessed and manipulated using a work management program 138. In some embodiments of the present invention, the data is preferably formatted as an XML document, and FIG. 9 illustrates exemplary work management data in XML format. The source of the data is typically an application program, such as the spreadsheet program 136, the database program 137, or some other application program 139. In step 302, the data can be read by the work management program 138.

In step 304 of the exemplary method 300, a determination is made of whether the data that was read in step 302 is in the form of a document object model (DOM) object (e.g., an XML DOM object). As is known in the art, a DOM object includes a programming interface that allows the object, such as an XML document, to be updated in structure and content. The determination of step 304 can be made by the work management program 138 or some other application program (not shown). If the data is in the form of a DOM object, the exemplary method 300 proceeds to step 308 in which the DOM object is compared to a work management schema 202. However, if the data is not in the form of a DOM object, the exemplary method 300 proceeds to step 306 and a DOM object is created from the data. The DOM object can be created by the work management program 138 or some other application program.

From step 306, the method 300 proceeds to step 308 and the DOM object is compared to a work management schema 202, as discussed above. After step 308, a determination is made in routine 310 of whether the data of the DOM object matches the work management schema 202. As discussed above, the schema 202 is preferably in XML format in some embodiments of the present invention. FIG. 11 illustrates exemplary element groups (which will be described below) of an exemplary work management schema according to an exemplary embodiment of the present invention. An exemplary submethod for decision routine 310 will be described below with respect to FIG. 4, and both step 308 and decision routine 310 can be executed by the work management program 138 or some other application program.

If, in decision routine 310, it is determined that the data does not match the schema 202, the data typically can not be used to create or merge a work management file. In such scenarios the process 300 proceeds to step 326, as depicted in FIG. 3, and an error message is delivered to the user via the user interface 206 from the work management program 138. However, if it is determined in decision routine 310 that the data does match the work management schema 202, the exemplary method proceeds to decision step 312 in which a determination is made of whether the data is to be used to create a new work management file or the data is to be appended to an existing work management file. This determination may be based on input from the user to the work management program 138 via the user interface 206, or it may be based on information contained in the data itself.

If it is determined in decision step 312 that the data will be used to create a new work management file or to append an existing work management file, the method 300 proceeds to routine 314 in which the work management program 138 loads the data into memory, such as the RAM 125, according to the predefined fields of a work management file. An exemplary submethod for routine 314 will be described below with respect to FIG. 6. However, if the determination is not affirmative (i.e., if it is No) in decision step 312, the method 300 proceeds to decision step 316. The method 300 also proceeds to decision step 316 after step 314.

In decision step 316, a determination is made of whether the data is to be merged with an existing work management file. The distinction between merging the data with an existing work management file and appending the data to an existing work management file is that in the former, the data is integrated into the existing data, whereas in the latter, the data is simply added to the end portion of an existing file. For example, if the data is merged, an existing work management task may be modified immediately with respect to the new data, however, if the data is appended, a new task may be added to the existing work management file and modified after the entire contents of the file is reviewed. Similar to step 312, the determination may be based on input from the user to the work management program 138 via the user interface 206, or it may be based on information contained in the data itself. If it is determined that the data is to be merged with an existing work management file, the method 300 proceeds to routine 318.

In routine step 318, a determination is made of the existence of any conflicts between the new data and the existing data of the work management file. If any conflicts exist, they are resolved, and the data is then merged with the existing data. An exemplary submethod for routine step 318 will be described below with respect to FIG. 7. The actions of routine step 318 can be implemented by the scheduling engine 208 by use of the work management rules 210 to determine and resolve any conflicts. The work management program 138 may also execute parts of routine 318 in some embodiments of the present invention. As mentioned above, FIG. 10 illustrates an exemplary rule to resolve a timing conflict between two tasks that can be part of a set of work management rules 210.

The exemplary method 300 proceeds to decision step 320 after routine 318 or if the determination in decision step 316 is not affirmative. In decision step 320, a determination is made of whether work management conflicts exist within the data of the work management file after it has been newly created appended, or merged. This determination is typically made by the scheduling engine 208 according to the work management rules 210. Conflicts may include conflicts between tasks, resources, assignments, and/or other particulars of the work management file. If it is determined that there are any conflicts in the data of the work management file, the method 300 proceeds to routine 322.

In routine 322, any work management conflicts in the data of the work management file are resolved. This step can be carried out by the scheduling engine 208 according to the rules 210, and the work management program 138 may also be involved in some embodiments of the present invention. An exemplary submethod for routine 322 will be described below with respect to FIG. 8.

Following routine 322, or if no conflicts are determined in decision step 320, the exemplary method 300 proceeds to step 324 in which the work management file data is displayed by the work management program 138 as an open work management file that can be accessed and manipulated by the user. For example, the work management file data can be displayed via the user interface 206. The method 300 concludes with step 324.

Figure 4:
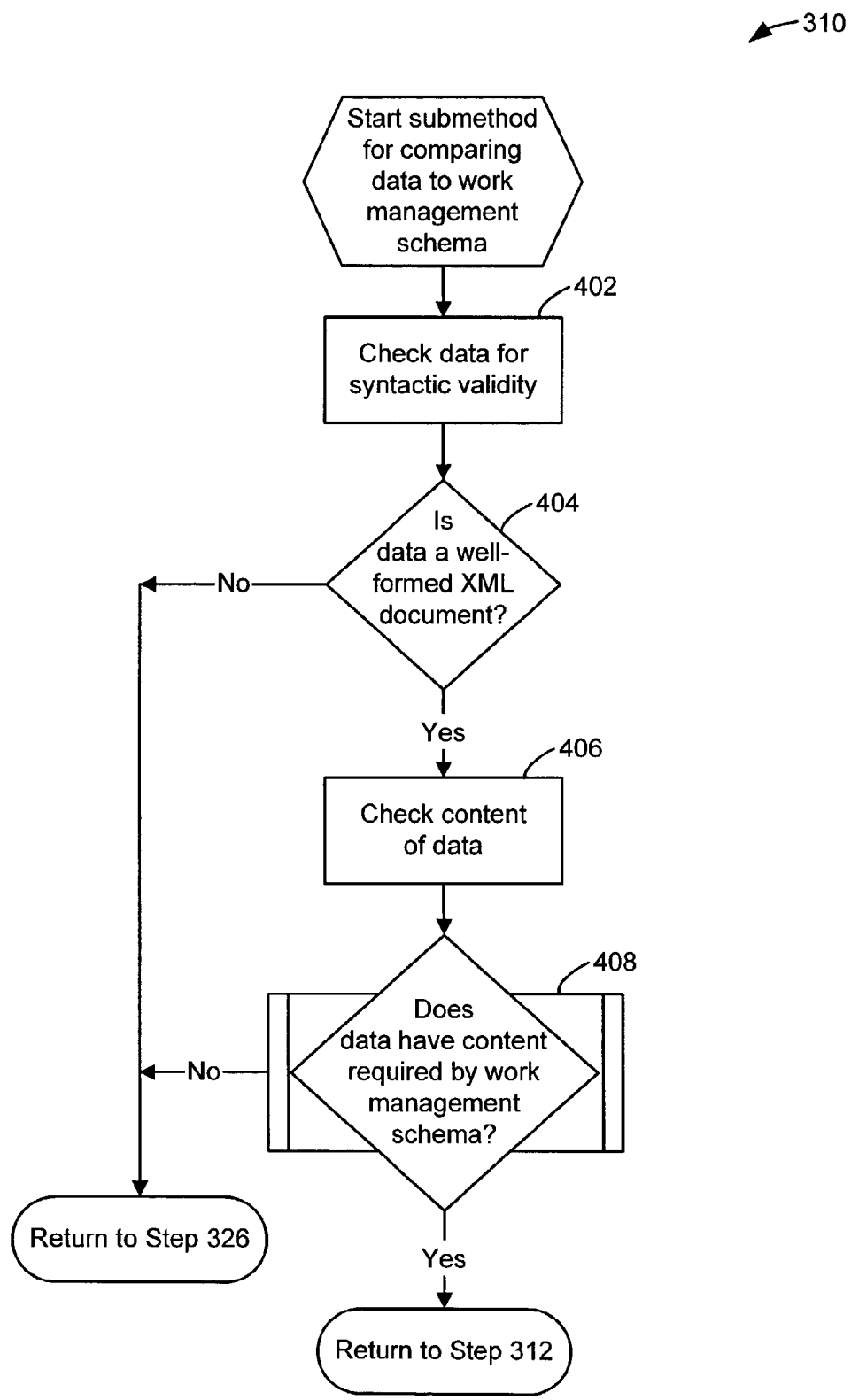
FIG. 4 is a logic flow diagram illustrating an exemplary submethod for comparing work management data to a work management schema that is part of the logic flow diagram illustrated in FIG. 3 according to an exemplary embodiment of the present invention.

Referring now to FIG. 4, this figure is a logic flow diagram illustrating an exemplary submethod for comparing work management data to a work management schema that is part of the logic flow diagram illustrated in FIG. 3 according to an exemplary embodiment of the present invention. As discussed above, the submethod or routine 310 can be carried out by the work management program 138 using the work management schema 202. The exemplary submethod 310 begins at step 402 in which the syntactic validity of the data is checked. The syntactic requirements for the data are typically contained in the schema 202. The syntactic requirements may include the proper format of tags, for example XML tags, in the data. For example, each element in the data must be indicated by a start-tag and an end-tag.

Following step 402, in step 404, a determination is made by the work management program 138 using the schema 202 as to whether the data read in step 302 is a "well-formed" XML document. This step 404 would of course apply if the data is introduced from the source in XML format, as preferred in some embodiments of the present invention. The requirements of a well-formed XML document are known in the art. These requirements include, for example, that all tags must be balanced, that al attribute values be in quotes, and that there be no isolated markup characters in text data. The requirements of a well-formed XML document are described, for example, in the publication entitled "XML in 10 Points" by the W3C Organization (see http://www.w3.org/XML/) at section D, which is hereby incorporated by reference. If the data is determined not to be a well-formed XML document in decision step 404, the submethod 310 returns to step 310 (FIG. 3) and the determination of step 310 is negative (i.e., No). However, if the data is determined to be well-formed, the submethod proceeds to step 406.

In step 406, the content of the data is checked against the guidelines of the schema 202. For example, in decision routine 408, following decision step 406, a determination is made of whether the data has the content that is required by the work management schema 202. The content required by the schema 202 may include certain data for tasks, resources, and/or other particulars of a work management file. An exemplary submethod for decision routine 408 will be described below with respect to FIG. 5. If it is determined in decision routine 408 that the data does not have the required content, the submethod 310 returns to step 312 and the determination of step 310 is negative (i.e., No). Alternatively, if the data is determined to have the required content, the submethod 310 returns to step 326 and the determination of step 310 is affirmative (i.e., Yes). The exemplary submethod 310 concludes with step 408.

Figure 5:
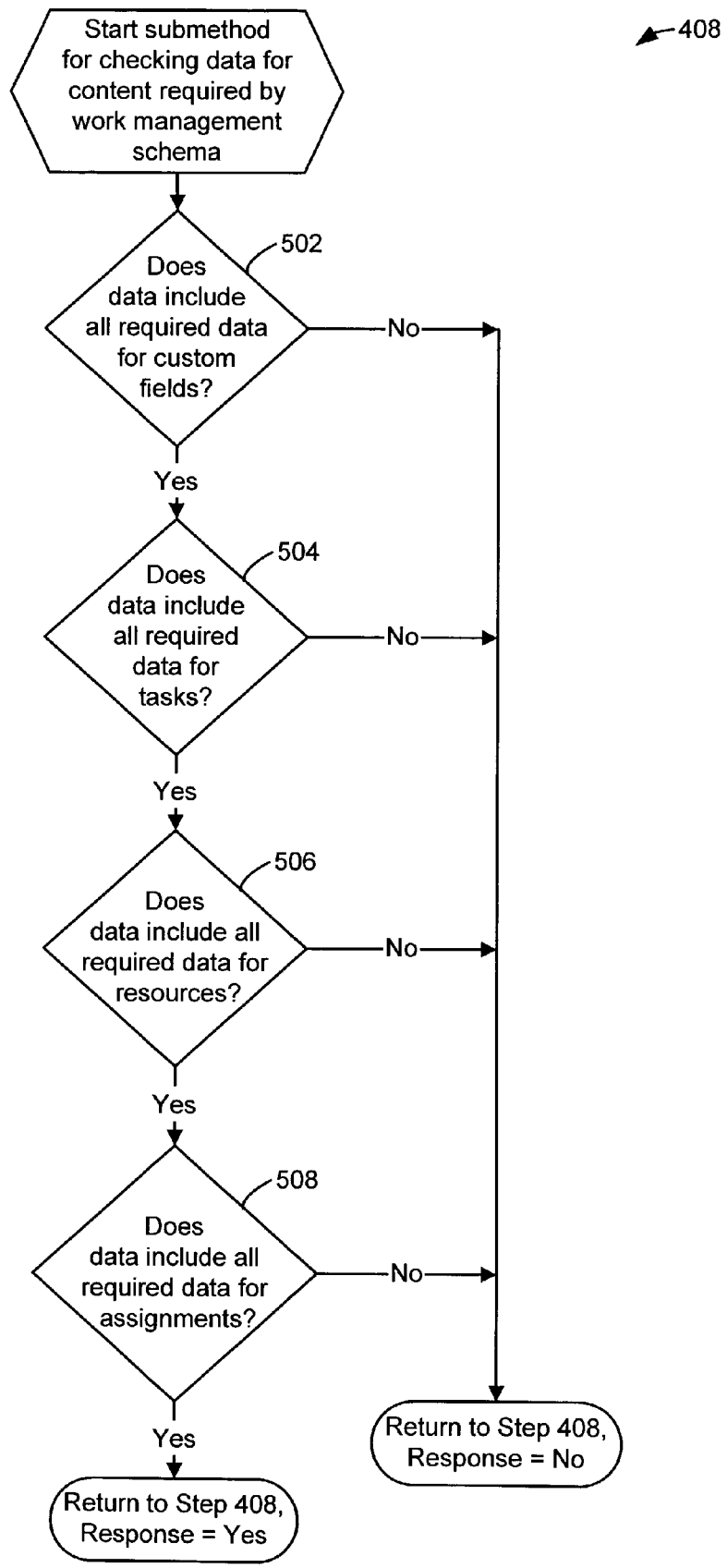
FIG. 5 is a logic flow diagram illustrating an exemplary submethod for checking data for content required by a work management schema that is part of the logic flow diagram illustrated in FIG. 4 according to an exemplary embodiment of the present invention.

FIG. 5 is a logic flow diagram illustrating an exemplary submethod for checking data for content required by a work management schema that is part of the logic flow diagram illustrated in FIG. 4 according to an exemplary embodiment of the present invention. As discussed above, the submethod 408 can be carried out by the work management program 138 using the work management schema 202. The exemplary submethod 408 starts with decision step 502 in which a determination is made of whether the data includes the required content for the custom fields of a work management file. If it is determined that the data includes the required content, the submethod 408 moves on to decision step 504.

In decision step 504, it is determined whether the data includes the required content for the tasks of a work management file. If it is determined that the data includes the required content for the tasks, the submethod 408 proceeds to decision step 506 in which the determination is made as to whether the data has the required content for the resources of a work management file. If the determination is made that the data includes the required content for the resources of the a work management file, the submethod 408 continues to decision step 508. In decision step 508, it is determined if the data includes the required content for the assignments of a work management file.

If it is determined at decision step 508 that the data includes the required content for the assignments of the work management file, the submethod 408 returns to step 408 (FIG. 4), and the determination of step 408 is affirmative. However, if the determination is negative for any of steps 502-508 of the submethod 408, the submethod 408 returns to step 408 and the determination of step 408 is negative.

Figure 6:
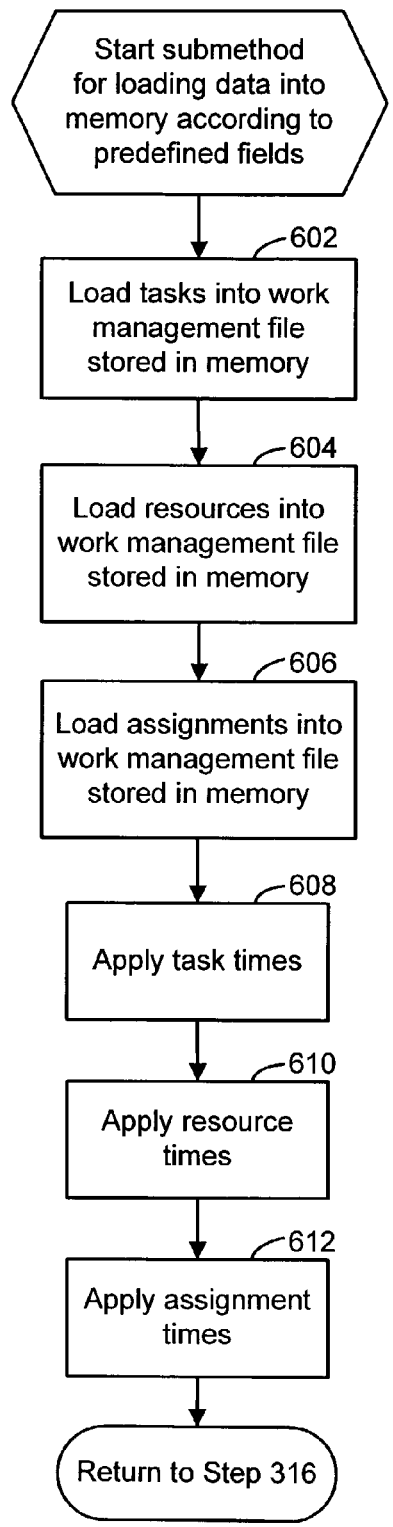
FIG. 6 is a logic flow diagram illustrating an exemplary submethod for loading data into a memory according to the predefined fields of a work management file that is part of the logic flow diagram illustrated in FIG. 3 according to an exemplary embodiment of the present invention.

Referring now to FIG. 6, this figure is a logic flow diagram illustrating an exemplary submethod or routine 314 for loading data into a memory according to the predefined fields of a work management file that is part of the logic flow diagram illustrated in FIG. 3 according to an exemplary embodiment of the present invention. As discussed above, the exemplary submethod 314 can be implemented by the work management program 138. The submethod starts with step 602 in which the data for tasks is loaded into a work management file that is stored in memory, such as the RAM 125.

Following step 602, the submethod 314 proceeds to step 604 in which the data for resources is loaded into the work management file that is stored in memory. After step 604 of the submethod 314, the data for assignments is loaded into the work management file in step 606. Step 608 follows step 606 in the submethod and the task times from the data are applied to the work management file in this step. Then in step 610, the resource times from the data are applied to the work management file. Finally, in step 612, the assignment times from the data are applied to the work management file, and the submethod 314 concludes by returning to step 316 (FIG. 3). The tasks times, resource times, and assignment times that are applied in steps 608, 610, and 612, respectively, are calendar information that may affect the scheduling of a project. For example, a task time may specify that the task of assembling an engine can be conducted between 1 p.m. and 4 p.m.

Figure 7:
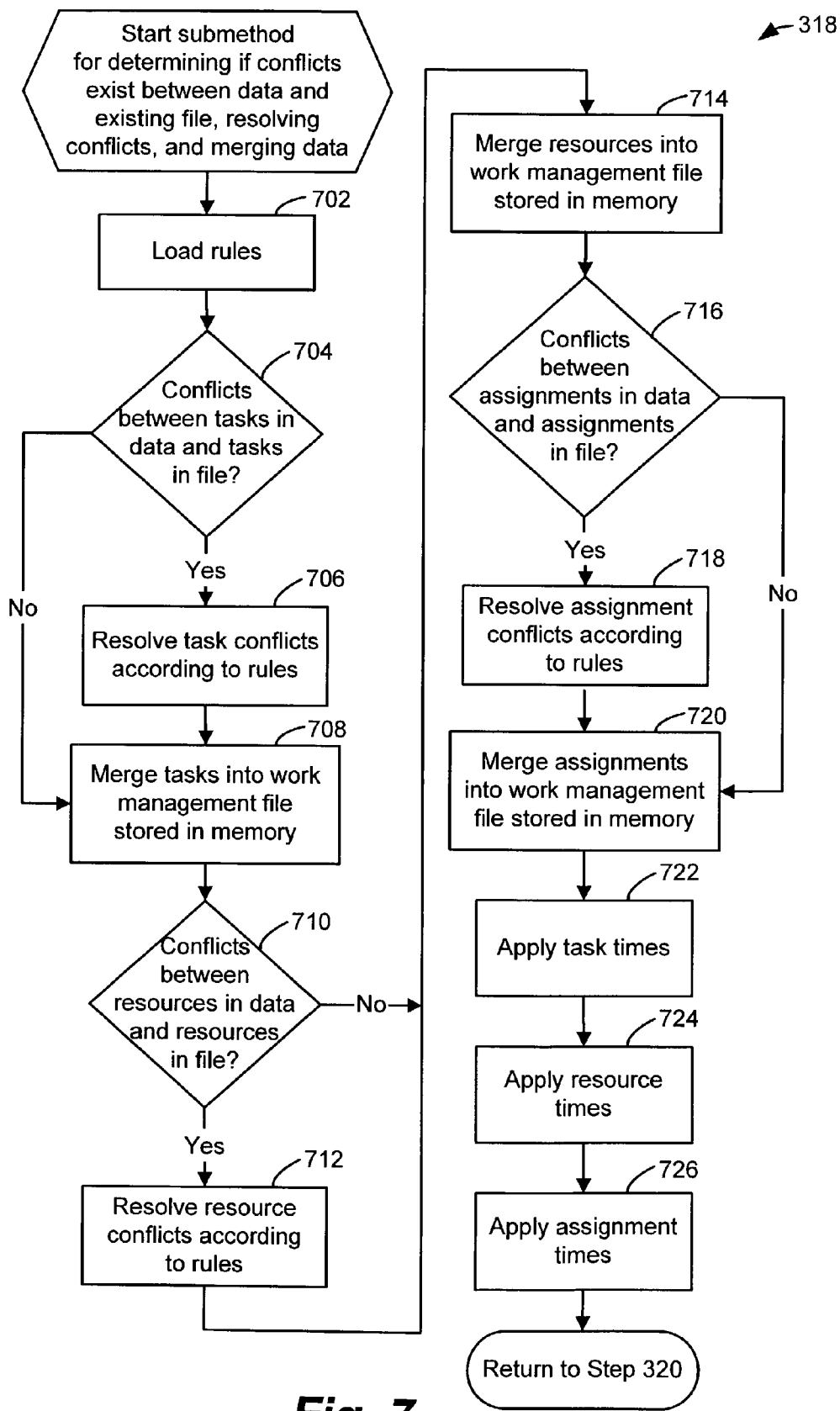
FIG. 7 is a logic flow diagram illustrating an exemplary submethod for determining if conflicts exist between data and an existing file, resolving the conflicts, and merging the data that is part of the logic flow diagram illustrated in FIG. 3 according to an exemplary embodiment of the present invention.

Referring to FIG. 7, this figure is a logic flow diagram illustrating an exemplary submethod 318 for determining if conflicts exist between data and an existing file, resolving the conflicts, and merging the data that is part of the logic flow diagram illustrated in FIG. 3 according to an exemplary embodiment of the present invention. This submethod 318 is usually performed when data is to be merged into an existing work management file. As discussed above, the steps of submethod 318 can be implemented by the scheduling engine 208 by use of the work management rules 210 to determine and resolve any conflicts, and the work management program 138 may also be involved with the performance of the steps in some embodiments. The exemplary submethod 318 begins at step 702 in which the rules 210 are loaded for use by the scheduling engine and, in some embodiments, by the work management program 138.

After step 702, in decision step 704 a determination is made of whether there are any conflicts between the tasks in the new data and the tasks in the existing data. If conflicts between the tasks are determined, the submethod 318 proceeds to step 706 in which the task conflicts are resolved according to the rules 210. Following step 706, or in the case that no conflicts are determined in decision step 704, the submethod continues to step 708. In step 708, the tasks in the new data and the tasks in the existing data are merged in the work management file that is stored in memory.

The submethod continues from step 708 to decision step 710. In decision step 710, it is determined whether there are any conflicts between the resources in the new data and the resources in the existing data. If conflicts in the resources are determined to exist, the conflicts are resolved according to the rules in step 712. The submethod 318 proceeds to step 714 after step 712, or if no conflicts are determined to exist in step 710. In step 714, the resources in the new data and the resources in the existing data are merged in the work management file that is stored in memory.

Following step 714, the determination of the existence of conflicts between the assignments in the new data and the assignments in the existing data is made in decision step 716.

If conflicts are determined to exist in the assignments, the submethod 318 proceeds to step 718 in which the conflicts are resolved according to the rules 210. From step 718, the submethod proceeds to step 720, which also occurs if no conflicts are determined in step 716. The assignments in the new data and the assignments in the existing data are merged in the work management file that is stored in memory in step 720.

From step 720, the submethod proceeds to step 722 in which the task times of the data are applied to the work management file. Then in step 724, the resource times are applied to the work management file. Following step 724, in step 726 the assignment times are applied to the work management file. As discussed above, with respect to steps 608, 610, and 612 in FIG. 6, the tasks times, resource times, and assignment times are calendar information that may affect the scheduling of a project. The submethod 318 concludes by returning to step 320 (FIG. 3).

Figure 8:
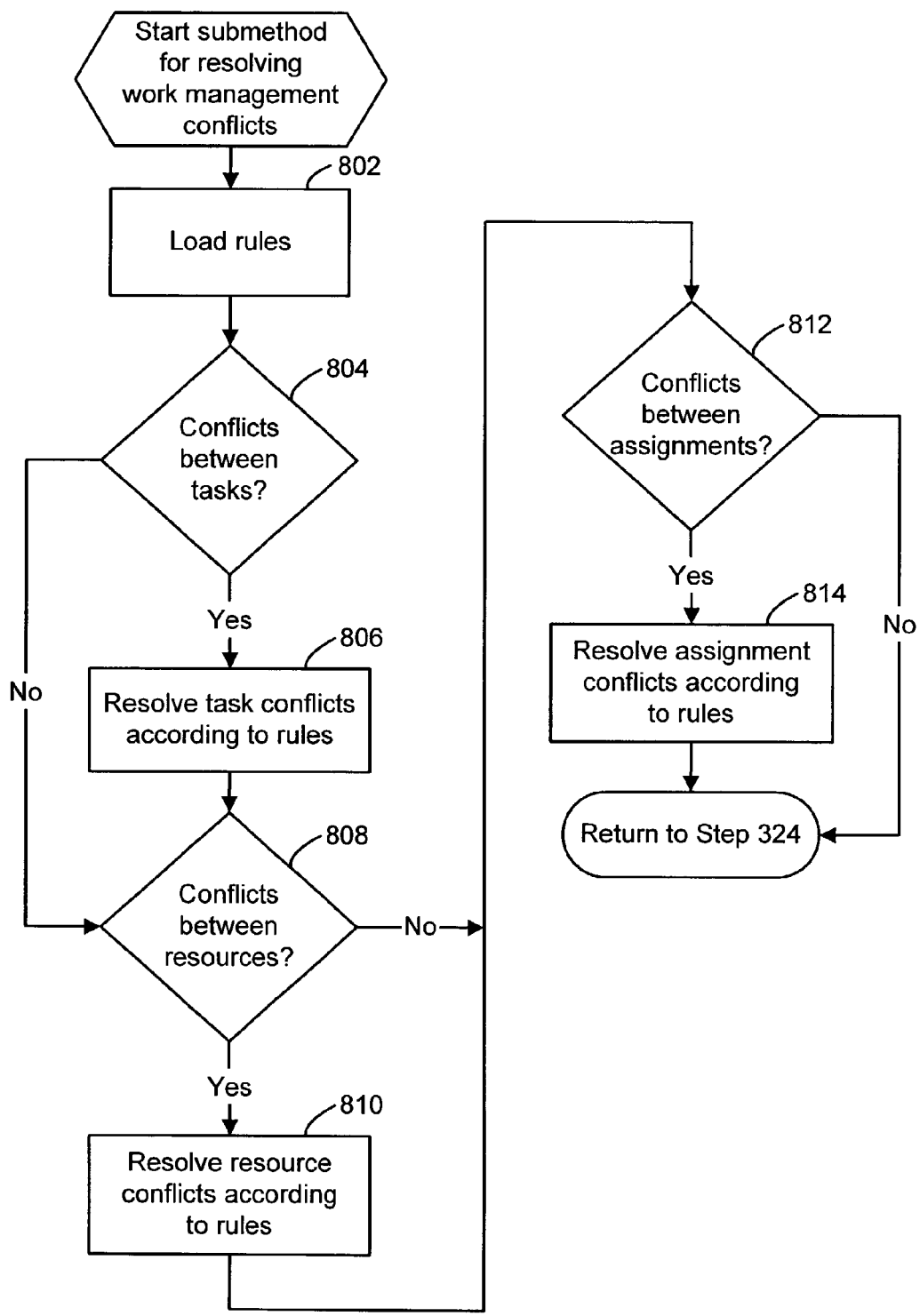
FIG. 8 is a logic flow diagram illustrating an exemplary submethod for resolving conflicts between the tasks, resources, and/or assignments of work management data and an existing work management file that is part of the logic flow diagram illustrated in FIG. 3 according to an exemplary embodiment of the present invention.

FIG. 8 is a logic flow diagram illustrating an exemplary submethod 322 for resolving conflicts between the tasks, resources, and/or assignments of work management data and an existing work management file that is part of the logic flow diagram illustrated in FIG. 3 according to an exemplary embodiment of the present invention. The steps of submethod 322 can be implemented by the scheduling engine 208 using the work management rules 210 to determine and resolve any conflicts, and the work management program 138 may also be involved with implementing the steps in some embodiments, as discussed above. The exemplary submethod 322 begins at step 802 in which the rules 210 are loaded for use by the scheduling engine and by the work management program 138, in some embodiments.

After step 802, in decision step 804 the determination is made of whether there are any conflicts in the tasks of the work management file. If conflicts in the tasks are determined, the submethod 322 proceeds to step 806 in which the task conflicts are resolved according to the rules 210. Following step 806, or in the event that no conflicts are determined in step 804, the submethod continues to step 808.

In decision step 808, it is determined whether there are any conflicts in the resources of the work management file. If conflicts in the resources are determined to exist, the conflicts are resolved according to the rules in step 810. The submethod 322 proceeds to decision step 812 after step 810, or if no conflicts are determined to exist in decision step 808.

In decision step 812, the determination of the existence of conflicts in the assignments of the work management file is made. If conflicts are determined to exist in the assignments, the submethod 322 proceeds to step 814 in which the conflicts are resolved according to the rules 210. After step 814, or if no conflicts in the assignments are determined to exist in step 812, the submethod 322 concludes by returning to step 324 (FIG. 3).

FIG. 9 illustrates exemplary work management data according to an exemplary embodiment of the present invention. As discussed above, the work management data 900 is illustrated in XML format. Thus, the data 900 includes tags for data content for a work management file. The work management data 900 includes conflicting data, because the start date (<start>) of task 1 and task 2 are the same. Specifically, task 1 and task 2 start on Jan. 1, 2001. However, task 2 requires that task 1 to be completed before task 2 since task 1 has been designated by task 2 as a predecessor task. As discussed above, a conflict such as the one illustrated in the data 900 can be resolved by the scheduling engine 208, the rules 210, and the work management program 138, in some embodiments.

FIG. 10 illustrates an exemplary rule, which is typically contained in the scheduling engine, to resolve conflicts between work management data according to an exemplary embodiment of the present invention. The rule 1000 is exemplary of the various rules 210 that are available to resolve conflicts in data for a work management file. The rule 1000 is exemplary of a rule that can be applied to resolve a conflict between two tasks that are scheduled for the same start date, when the start of one task is dependent on the completion of the other, such as the tasks illustrated by the data 900 of FIG. 9.

FIG. 11 illustrates exemplary element groups of an exemplary work management schema according to an exemplary embodiment of the present invention. As discussed above, the schema 1100 is preferably formatted in XML in some embodiments of the present invention. As depicted in FIG. 11, the exemplary schema 1100 includes several element groups. There are the exemplary time phased elements 1102 and the exemplary task elements 1104. There are also exemplary calendar elements 1106, exemplary resource elements 1108, and exemplary assignment elements 1110. The elements illustrated in each exemplary element group 1102-1110 in FIG. 11 are exemplary of elements of data that may be included a work management file. However, the present invention is not limited to the work management schema elements illustrated. Other work management schema elements are not beyond the scope of the present invention.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for creating a work management file, comprising:
   reading data from a source, wherein the read data is formatted as an XML document;
   determining if the read data is in the form of a document object model object;
   comparing the document object model object to a work management schema to determine if the read data is compatible with a work management program;
   after it is determined that the read data is compatible, comparing the read data to the work management schema to determine if the read data matches the work management schema by
      determining if the read data is syntactically valid by determining if it represents a well-formed XML document; and
      determining if the read data includes task, resource, or assignment content in accordance with the work management schema,
      determining if a work conflict exists in the read data between a plurality of tasks, resources, or assignments;
      resolving at least one work conflict determined to exist in the read data by applying a rule to resolve the work conflict and create work management data; and
   displaying the created work management data as the work management file.

2. The method of claim 1, further comprising creating an object compatible with the work management program if the read data is determined not to be compatible with the work management program.

3. The method of claim 1, further comprising loading the read data from the source into a memory according to predefined fields of the work management file.

4. A machine-readable medium having program code stored thereon which, when executed by a machine, causes the machine to execute a method for creating a work management file, the method comprising:
   reading data from a source, wherein the read data is formatted as an XML document;
   determining if the read data is in the form of a document object model object;
   comparing the document object model object to a work management schema to determine if the read data is compatible with a work management program;
   after it is determined that the read data is compatible, comparing the read data to the work management schema to determine if the read data matches the work management schema by
      determining if the read data is syntactically valid by determining if it represents a well-formed XML document; and
      determining if the read data includes task, resource, or assignment content in accordance with the work management schema;
      determining if a work conflict exists in the read data between a plurality of tasks, resources, or assignments;
      resolving at least one work conflict determined to exist in the read data by applying a rule to resolve the determined work conflict and create work management data; and
   displaying the created work management data as the work management file.

5. The method of claim 4, wherein the method further comprises instructions for determining if the read data is part of an object compatible with a work management program.

6. The method of claim 5, wherein the method further comprises instructions for creating an object compatible with the work management program if the read data is determined not to be compatible with the work management program.

7. A computer system for creating a work management file, comprising:
   a computer processing unit that is configured to:
      read data from a source, wherein the read data is formatted as an XML document;
      determine if the read data is in the form of a document object model object;
      compare the document object model object to a work management schema to determine whether the read data is compatible with a work management program;
      after it is determined that the read data is compatible, comparing the read data to the work management schema to determine whether the read data matches the work management schema by:
         determining if the read data is syntactically valid by determining if it represents a well-formed XML document; and
         determining if the read data includes task, resource, or assignment content in accordance with the work management schema;
      determine whether a work conflict exists in the read data between a plurality of tasks, resources, or assignments;
      resolve the work conflict determined to exist by applying a rule to resolve the work conflict and create work management data; and display the created work management data as the work management file.

8. The computer system of claim 7, wherein the computer processing unit is further configured to load the read data from the source into a memory according to predefined fields of the work management file.

9. The computer-system of claim 7, wherein the computer processing unit is further configured to display the created work management data as an open work management file.

10. The computer system of claim 7 wherein the processing unit is further configured to create a compatible form of the read data when it is determined the read data is not compatible.

11. The computer system of claim 7 wherein the processing unit is further configured to apply a rule to resolve a conflict between a first task and a second task, wherein the first and second tasks are scheduled for the same start date and wherein the start of the second task is dependent on the completion of the first task.

* * * * *

UNITED STATES PATENT AND TRADEMARK OFFICE
CERTIFICATE OF CORRECTION

| | | |
|---|---|---|
| PATENT NO. | : 7,451,158 B1 | |
| APPLICATION NO. | : 10/305632 | |
| DATED | : November 11, 2008 | |
| INVENTOR(S) | : Bob Vogt et al. | |

It is certified that error appears in the above-identified patent and that said Letters Patent is hereby corrected as shown below:

In column 13, line 55, in Claim 1, delete "schema," and insert -- schema; --, therefor.

Signed and Sealed this
Third Day of May, 2011

David J. Kappos
*Director of the United States Patent and Trademark Office*